United States Patent [19]

Erbert

[11] Patent Number: 5,132,979

[45] Date of Patent: Jul. 21, 1992

[54] LASER FREQUENCY MODULATOR FOR MODULATING A LASER CAVITY

[75] Inventor: Gaylen V. Erbert, Livermore, Calif.

[73] Assignee: The United States of America as represented by the United States Department of Energy, Washington, D.C.

[21] Appl. No.: 745,793

[22] Filed: Aug. 16, 1991

[51] Int. Cl.$^5$ .............................. H01S 3/10
[52] U.S. Cl. ....................... 372/28; 372/99; 372/107
[58] Field of Search ..................... 372/28, 99, 107

[56] References Cited

U.S. PATENT DOCUMENTS

| | | | |
|---|---|---|---|
| 3,299,368 | 1/1967 | Klebba | 372/99 |
| 3,427,456 | 2/1969 | Caulfield | 372/99 |
| 3,449,692 | 6/1969 | Haake | 372/99 |
| 4,691,323 | 9/1987 | Ljung et al. | 372/99 |
| 4,947,399 | 8/1990 | Sheldon | 372/107 |
| 4,969,726 | 11/1990 | Koning | 372/107 |
| 4,972,428 | 11/1990 | Hinz et al. | 372/99 |

Primary Examiner—William L. Sikes
Assistant Examiner—Robert E. Wise
Attorney, Agent, or Firm—M. A. Valdes; Roger S. Gaither; William R. Moser

[57] ABSTRACT

The present invention relates to a laser frequency modulator for modulating a laser cavity. It is known in the prior art to utilize a PZT (piezoelectric transducer) element in combination with a mirror to change the cavity length of a laser cavity (which changes the laser frequency). Using a PZT element to drive the mirror directly is adequate at frequencies below 10 kHz. However, in high frequency applications (100 kHz and higher) PZT elements alone do not provide a sufficient change in the cavity length.

The present invention utilizes an ultrasonic concentrator with a PZT element and mirror to provide modulation of the laser cavity. With an ultrasonic concentrator, the mirror element at the end of a laser cavity can move at larger amplitudes and higher frequencies.

1 Claim, 2 Drawing Sheets

LASER FREQUENCY MODULATOR FOR MODULATING A LASER CAVITY

FIELD OF THE INVENTION

The United States Government has rights in this invention pursuant to Contract No. W-7405-ENG-48 between the United States Department of Energy and the University of California for operation under Lawrence Livermore National Laboratory.

BACKGROUND OF THE INVENTION

The present invention relates to a laser frequency modulator for modulating a laser cavity. In prior art approaches, a laser frequency modulator utilizes a PZT (piezoelectric transducer) attached directly to a mirror of the laser cavity. Applying a suitable AC voltage to the PZT element provides for corresponding mechanical motion of the PZT and attached mirror and hence modulates the laser cavity. The prior art approaches cannot be operated at large amplitudes at high frequencies in a continuous mode because the device overheats. Many applications require continuous modulation of the laser cavity.

SUMMARY OF THE INVENTION

It is an object of the present invention to provide an improved laser frequency modulator for modulating a laser cavity.

The present invention utilizes an ultrasonic concentrator with a PZT element and mirror to provide continuous modulation of the laser cavity at large amplitudes and high frequencies.

Other objects, advantages and novel features of the present invention will be set forth in part in the description which follows, and in part become apparent to those skilled in the art upon examination of the following, or may be learned by practice of the invention. The objects and advantages of the invention may be realized and attained by means of the instrumentalities and combinations which are pointed out in the appended claims.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Figure 1:
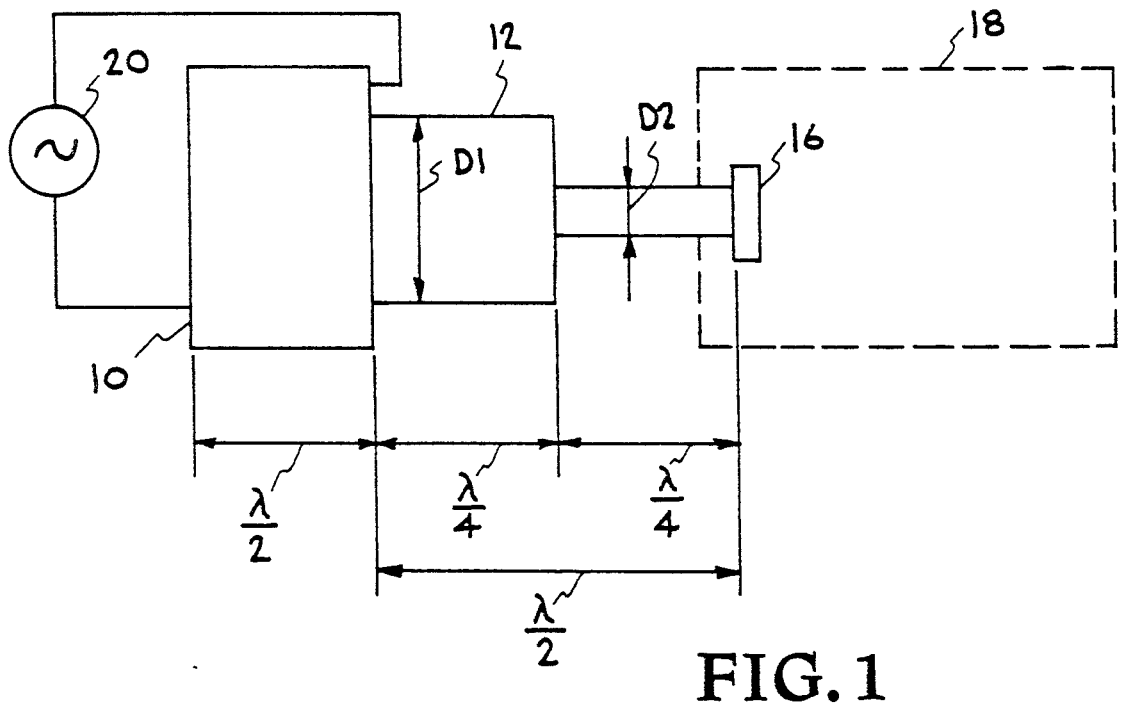
FIG. 1 shows a diagram of an improved laser frequency modulator according to the present invention.

The present invention is shown in one embodiment in FIG. 1, in which a PZT element 10 is combined with an ultrasonic concentrator 12, which in turn is combined with the end mirror 16 of a laser 18.

An AC voltage 20 is applied to the PZT element 10 which with the combination of ultrasonic concentrator 12 moves the mirror 16 in a desired fashion. The concentrator 12 is a resonant device, the length of which is determined by the frequency desired for operation. Its length is in general one-half the wavelength of sound in the particular material at the operating frequency. The type of material which typically could be used with the ultrasonic concentrator 12 is aluminum, although other materials such as magnesium could be utilized also.

The ultrasonic concentrator 12 amplifies the motion of the PZT. The amplification is determined by the ratio of $D_1^2/D_2^2$, as shown in FIG. 1.

Figure 2:
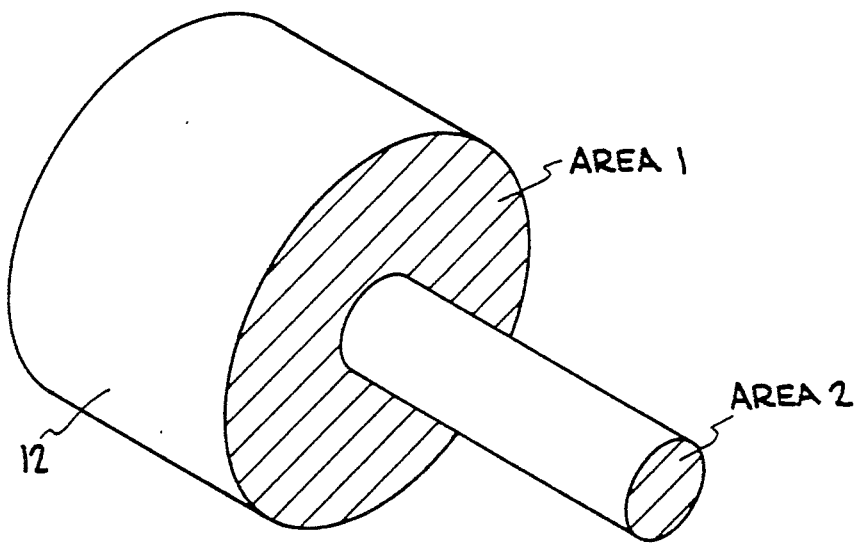
FIG. 2 shows an isometric view of the ultrasonic concentrator of FIG. 1.

Also the amplification can be determined by the ratio of the AREA 1/AREA 2 as shown in the isometric view of the ultrasonic concentrator in FIG. 2.

Referring again to FIG. 1, the higher the AC voltage 20 applied to PZT element 10, the further the mirror 16 will move. The voltage range applied could be from millivolts to hundreds of volts. The frequency is determined by the resonant frequency of the concentrator 12 and PZT element 10 so that one could design the modulator for any desired frequency, as necessary. The dimensions of the mirror 16 are kept small to minimize coupling acoustic energy from the ultrasonic concentrator 12 into the mirror 16. In general, the mirror dimensions should be much less than $\frac{1}{4}$ the wavelength of sound in the mirror at the operating frequency.

Figure 3:
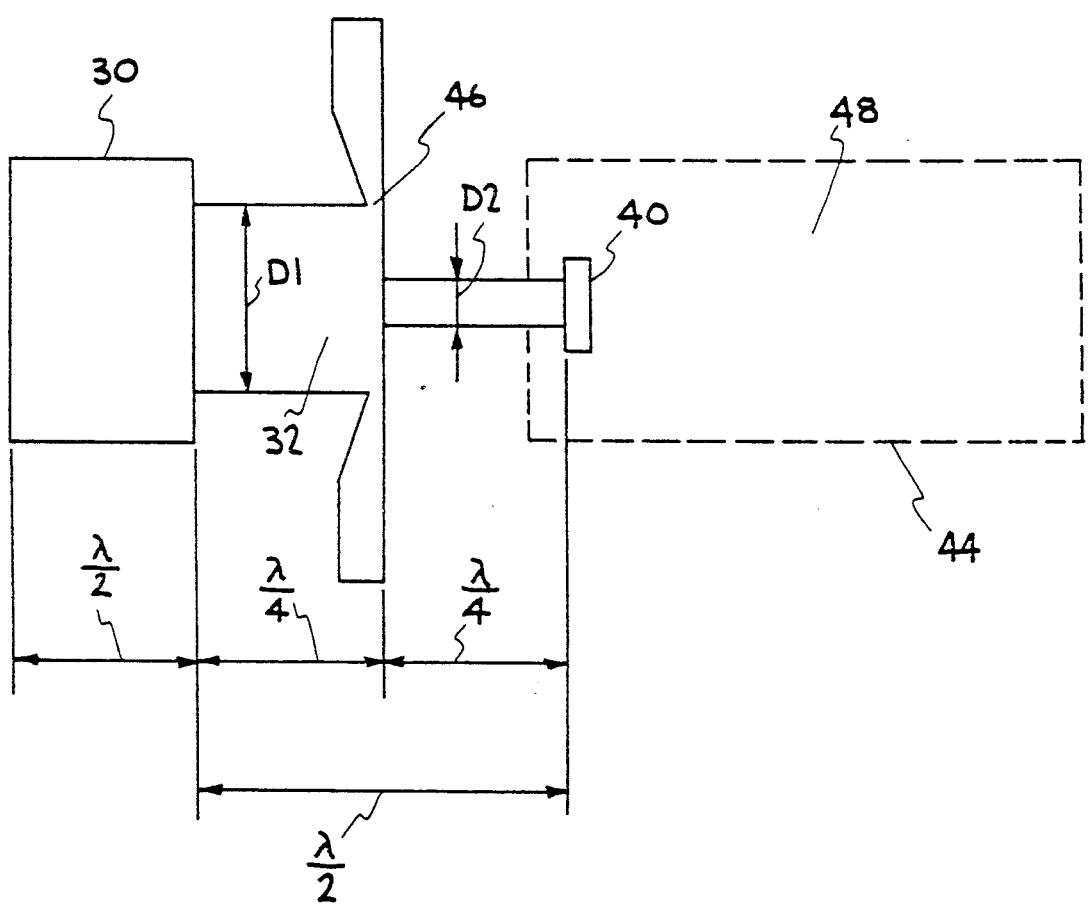
FIG. 3 shows another embodiment of a laser frequency modulator according to the present invention.

FIG. 3 shows another embodiment of a combination of a PZT element 30 with an ultrasonic concentrator 32 connected to one end of a mirror 40 of laser 44. Again, the diameters $D_1$ and $D_2$ can be seen in FIG. 3. FIG. 3 embodiment shows a nodal point 46 at which there is no motion and therefore can be used to mount the resonant structure. As the combination of the PZT element 30 and ultrasonic concentrator 32 move, this changes the length of the laser cavity 48, which changes the frequency of operation. This is to say it "tunes" the frequency.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claim appended hereto and its equivalent.

What is claimed is:

1. A laser frequency modulator for modulating a laser cavity, said modulator comprising
   a piezoelectric transducer (PZT) element,
   an ultrasonic concentrator connected between one end of a mirror of said laser cavity and said PZT element,
   means for applying an AC voltage to said PZT element so as to effect a motion of said PZT element and said ultrasonic concentrator to effect a corresponding motion to said mirror.

* * * * *